United States Patent
Laurain et al.

[11] Patent Number: 5,903,119
[45] Date of Patent: May 11, 1999

[54] CONVERTIBLE ROOF ACTUATION MECHANISM

[75] Inventors: Steven G. Laurain, Riverview, Mich.; Michael T. Willard, E-S Lake Oswego, Oreg.; William A. Sims, Lincoln Park, Mich.

[73] Assignee: ASC Incorporated, Southgate, Mich.

[21] Appl. No.: 08/916,822

[22] Filed: Aug. 22, 1997

[51] Int. Cl.⁶ .................................. B60J 7/08; B60J 7/22
[52] U.S. Cl. ......................... 318/265; 318/286; 318/467; 296/107; 296/180.1; 296/180.5
[58] Field of Search ..................................... 318/265, 286, 318/467; 296/107, 180.1, 180.5, 108, 117, 122, 121, 116, 118

[56] References Cited

U.S. PATENT DOCUMENTS

| | | |
|---|---|---|
| 2,230,140 | 1/1941 | Falcon . |
| 2,267,471 | 12/1941 | Keller . |
| 2,297,820 | 10/1942 | Westrope . |
| 2,322,839 | 6/1943 | Falcon . |
| 2,329,802 | 9/1943 | Westrope . |
| 2,368,133 | 1/1945 | Galamb . |
| 2,372,583 | 3/1945 | Keller . |
| 2,376,949 | 5/1945 | Westrope . |
| 2,459,089 | 1/1949 | Orr . |
| 2,540,454 | 2/1951 | Milhan . |
| 2,580,486 | 1/1952 | Vigmostad . |
| 2,768,857 | 10/1956 | Albrecht . |
| 2,770,489 | 11/1956 | Garvey et al. . |
| 2,895,764 | 7/1959 | Himka et al. . |
| 3,030,140 | 4/1962 | Probst ..................................... 296/107 |
| 3,536,354 | 10/1970 | Ingram . |
| 3,994,524 | 11/1976 | Lehmann . |
| 4,487,447 | 12/1984 | Schroder . |
| 4,537,440 | 8/1985 | Brockway et al. . |
| 4,720,133 | 1/1988 | Alexander et al. . |
| 4,778,215 | 10/1988 | Ramaciotti ............................... 296/107 |
| 4,784,428 | 11/1988 | Moy et al. . |
| 4,828,317 | 5/1989 | Muscat . |
| 4,838,601 | 6/1989 | Kolb . |
| 4,936,626 | 6/1990 | Gmeiner et al. ......................... 296/108 |
| 4,948,194 | 8/1990 | Dogliani . |
| 5,067,768 | 11/1991 | Fischbach ................................ 296/107 |
| 5,161,852 | 11/1992 | Alexander et al. . |

(List continued on next page.)

FOREIGN PATENT DOCUMENTS

| | | |
|---|---|---|
| 364774 | 11/1981 | Austria . |
| 530770 | 9/1956 | Canada . |
| 0 351 378 | 1/1990 | European Pat. Off. . |
| 2 661 140 | 10/1991 | France . |
| 3724531 C1 | 12/1988 | Germany . |
| 3937764 C1 | 12/1990 | Germany . |
| 4129493 C1 | 8/1992 | Germany . |
| 548569 | 9/1956 | Italy . |
| 836677 | 6/1960 | United Kingdom . |
| 995393 | 6/1965 | United Kingdom . |
| 1 223 070 | 2/1971 | United Kingdom . |

OTHER PUBLICATIONS

7 Sheets of photographs of the BMW 318 series convertible topstack header latching system.
Description and Exhibit A, drawing of No. 4 bow of 1997 Bentley Azure, prior to Aug. 22, 1997, 1 page.
Exhibit B, 1996 Rolls Royce Corniche convertible top, portion of Rolls Royce Parts, Service and Maintenance CD–ROM, prior to Aug. 22, 1997, 3 pages.

*Primary Examiner*—Paul Ip
*Attorney, Agent, or Firm*—Harness, Dickey & Pierce, P.L.C.

[57] ABSTRACT

A convertible roof actuation mechanism includes a pliable roof cover, a top stack mechanism supporting the roof cover, and at least one roof bow of the top stack mechanism independently movable relative to the remainder of the top stack mechanism for selectively reducing and increasing tension of the roof cover during latching. In another aspect of the present invention, at least one roof bow is retracted closer to a bottom pivot of a rear roof rail when stowed to optimize packaging space within a convertible roof storage compartment.

39 Claims, 8 Drawing Sheets

U.S. PATENT DOCUMENTS

| | | | |
|---|---|---|---|
| 5,225,747 | 7/1993 | Helms et al. . | |
| 5,338,085 | 8/1994 | Guckel et al. | 296/121 |
| 5,385,381 | 1/1995 | Moore et al. | 296/117 |
| 5,429,409 | 7/1995 | Corder et al. | 296/108 |
| 5,445,429 | 8/1995 | Koehler et al. . | |
| 5,620,226 | 4/1997 | Sautter, Jr. . | |
| 5,667,269 | 9/1997 | Prenger et al. | 296/107 |

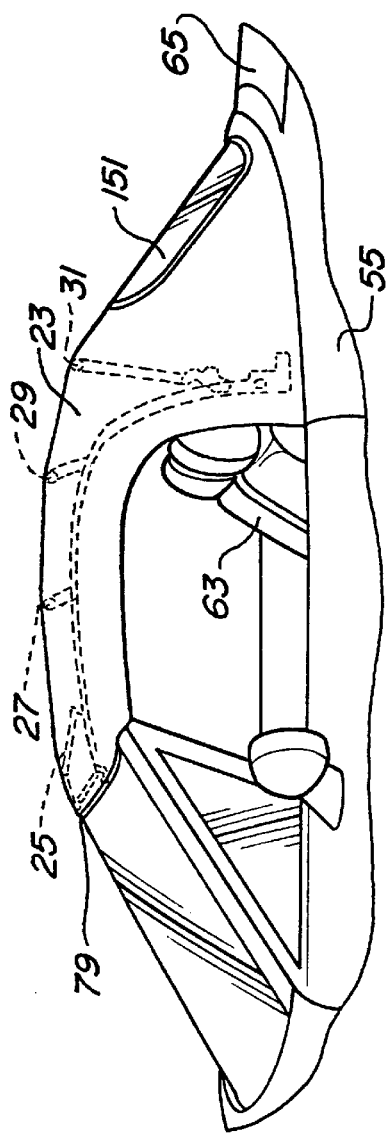
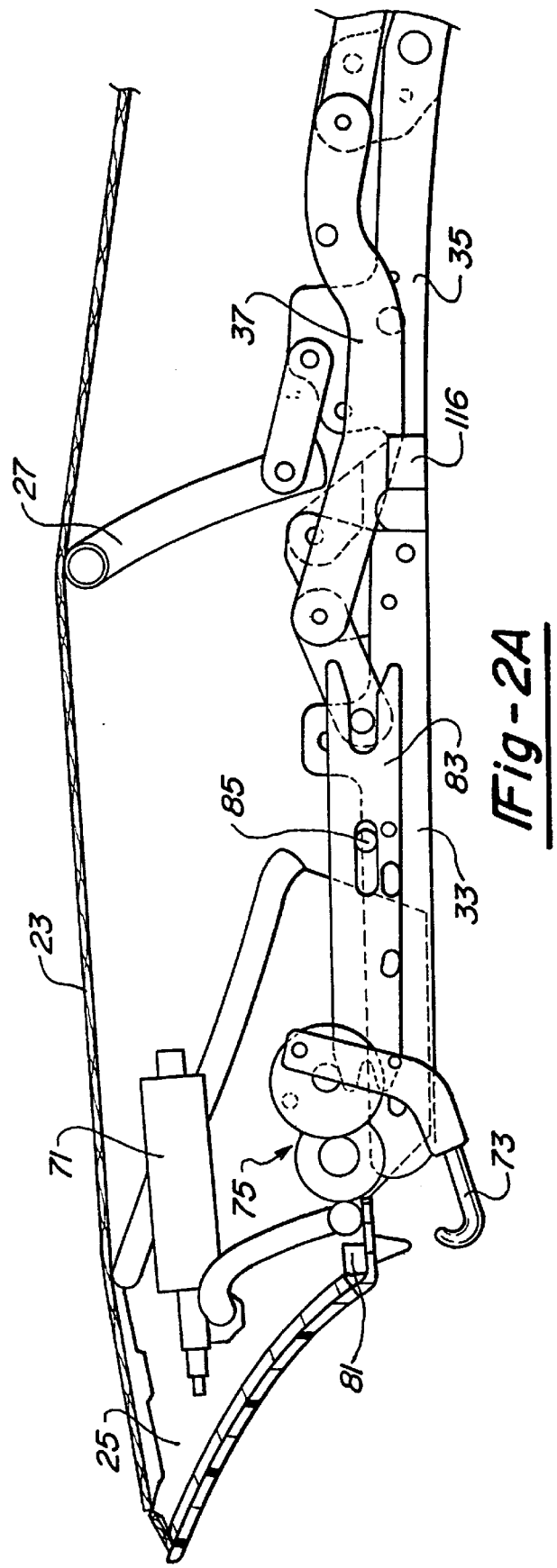
Fig-1
Fig-2A

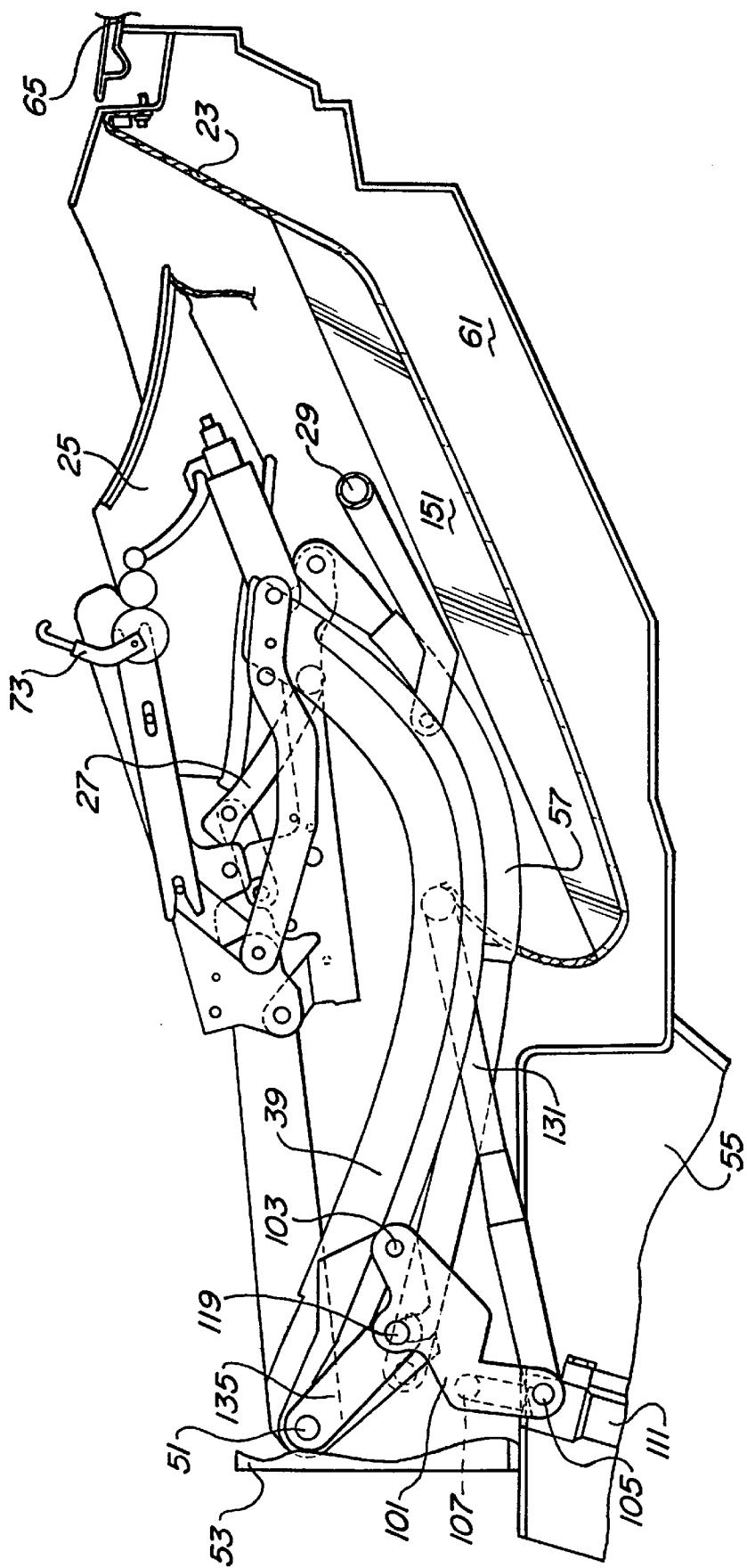

CONVERTIBLE ROOF ACTUATION MECHANISM

BACKGROUND AND SUMMARY OF THE INVENTION

This invention relates generally to automotive vehicle convertible roofs and more particularly to a convertible roof actuation mechanism.

Traditional soft-top convertible roofs for automotive vehicles typically employ four or five roof bows spanning transversely across the vehicle for supporting a vinyl, canvas or polyester fiber pliable roof cover. The number one roof bow is mounted to a pair of front roof rails and is typically latched to a stationary front header panel of the automotive vehicle body disposed above a windshield. A number two roof bow is typically mounted to a pair of center roof rails which are pivotably coupled to the front roof rails. Furthermore, the number three, four and optional five roof bows are commonly mounted to a pair of rear roof rails which are pivotably coupled to the center roof rails. For example, reference should be made to U.S. Pat. Nos. 5,225,747 entitled "Single-Button Actuated Self-Correcting Automatic Convertible Top" which issued to Helms et al. on Jul. 6, 1993; 5,161,852 entitled "Convertible Top with Improved Geometry" which issued to Alexander et al. on Nov. 10, 1992; 4,948,194 entitled "Flexible Roof for a Convertible Motor Vehicle, Provided with a Safety Hook for the Rear Arch of the Roof Frame" which issued to Dogliani on Aug. 14, 1990; 4,720,133 entitled "Convertible Top Structure" which issued to Alexander et al. on Jan. 19, 1988; 4,537,440 entitled "Vehicle with a Convertible Top" which issued to Brockway et al. on Aug. 27, 1985; and 2,580,486 entitled "Collapsible Top for Vehicles" which issued to Vigmostad on Jan. 1, 1952.

Traditional soft-top convertible roofs possess an inherent drift problem. In other words, when the convertible roof is moved to its fully raised position, the forwardmost or number one roof bow is positioned against the front header panel for subsequent latching. However, the stretched fabric cover acts to pull the number one roof bow in an unintended and undesired rearward direction such that it drifts away from the front header. This drifting situation is especially apparent in new convertible roofs. Accordingly, the vehicle occupant must then physically pull down upon a handle attached to the number one roof bow thereby pulling it against the front header panel for subsequent latching. This manual action presents a crude and unrefined operational perception. This drifting problem is also present between a rearmost or number five roof bow and an adjacent tonneau cover. The number five roof bow is often raised to an upward position while the tonneau cover is returned from a substantially vertical position to a substantially horizontal position; the number five roof bow is then pivoted to its lowered position against an upper surface of the tonneau cover for latching thereto. However, the stretched fabric covering tends to pull the number five roof bow in a forward manner thereby causing it to drift away from the tonneau cover. This situation is inconvenient to remedy due to the difficulty of an occupant accessing this rear area when seated in the front seat.

In accordance with the present invention, the preferred embodiment of a convertible roof actuation mechanism includes a pliable roof cover, a top stack mechanism supporting the roof cover, and at least one roof bow of the top stack mechanism independently movable relative to the remainder of the top stack mechanism for selectively reducing and increasing tension of the roof cover during latching. In another aspect of the present invention, at least one roof bow is retracted closer to a bottom pivot of a rear roof rail when stowed to optimize packaging space within a convertible roof storage compartment. In a further aspect of the present invention, a rigid backlite is attached to a pliable roof cover. Still another aspect of the present invention provides a rear edge of the roof cover being stationarily affixed to a body of the automotive vehicle throughout all of the positions of the convertible roof.

The convertible roof actuation mechanism of the present invention is advantageous over conventional devices in that the present invention reduces drifting of the raised convertible roof away from the front header panel and, alternately, a tonneau cover by selectively reducing and then increasing tension or tautness of the roof cover. Furthermore, packaging space of the stowed convertible roof is optimized in the storage compartment by retracting movement of a number four roof bow forward in the vehicle from where it would otherwise be if it were pivoted about a fixed pivot point mounted directly on the rear roof rail or on the main pivot bracket, as is done in traditional vehicles; this allows for placement of a very large and rigid backlite in a relatively small storage compartment, thereby avoiding the creasing and discoloration disadvantages commonly associated with folded flexible backlites made of plastic. The present invention is also advantageously employed in combination with stationary affixation of the rear edge of the roof cover to the body where front header panel latching drift and tension problems are often exacerbated. Additional advantages and features of the present invention will become apparent from the following description and appended claims, taken in conjunction with the accompanying drawings.

BRIEF DESCRIPTION OF THE DRAWINGS

FIG. 1 is a side elevational view showing the preferred embodiment of a convertible roof actuation mechanism of the present invention;

FIG. 2A is a side elevational view, partially in section, showing a forward portion of the preferred embodiment of the convertible roof actuation mechanism, disposed in a fully extended and latched position;

FIG. 8 is a side elevational view showing the preferred embodiment of the convertible roof actuation mechanism, disposed in a fully retracted and stowed position.

DETAILED DESCRIPTION OF THE PREFERRED EMBODIMENT

Figure 2B:
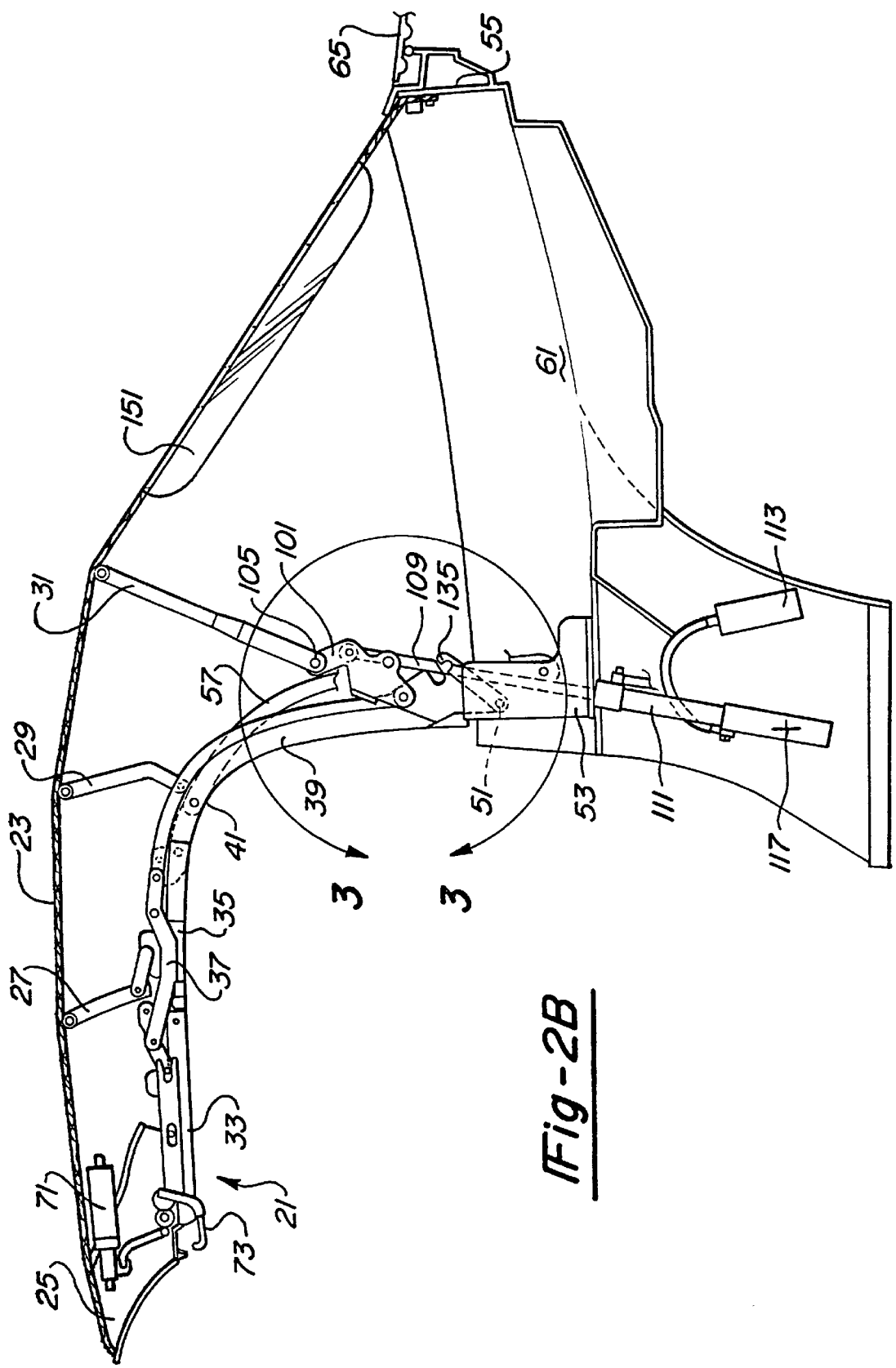
FIG. 2B is a side elevational view, partially in section, showing the preferred embodiment of the convertible roof actuation mechanism, disposed in a fully extended and latched position.

As can be observed in FIGS. 1, 2A and 2B, a soft-top convertible roof for an automotive vehicle includes a top stack mechanism 21 and a pliable roof cover 23. Top stack mechanism 21 employs a number one roof bow 25, a number two roof bow 27, a number three roof bow 29 and a number four roof bow 31. Front roof rail 25 is preferably integrally cast from a magnesium alloy with a pair of front roof rails 33. A pair of center roof rails 35 are pivotably coupled to front roof rails 33 by over-center control linkage assemblies 37. A pair of rear roof rails 39 are coupled to center roof rails 35 by pivots 41. A bottom pivot 51 of each rear roof rail 39 is coupled for movement to a main pivot bracket 53 which is bolted or welded onto a stationary structure affixed to a body 55 of the automotive vehicle. A pair of balance links 57 each have a first end pivotably coupled to bracket 53 and a second end pivotably coupled to each center roof rail 35. Over-center control linkage assembly 37 is connected between front roof rail 33 and rear roof rail 39. Accordingly, the convertible roof can be automatically moved from a fully extended or raised position, as is shown in FIGS. 1–2B, to a fully retracted position, as is shown in FIG. 8, within a storage compartment or boot well 61. Boot well 61 is longitudinally located between a front occupant seat 63 and a trunk 65. Rear roof rail 39 is preferably die cast and subsequently machined from a magnesium alloy while balance link 57 and the roof bows are made from a carbon steel tubing with swaged ends. Main pivot bracket 53 is stamped from steel or is cast from aluminum or magnesium.

Roof cover 23 is in a stretched and tensioned condition when the convertible roof is in its fully raised condition, as is shown in FIGS. 1–2B. In the fully raised position, an electric motor actuator 71, centrally mounted to number one roof bow 25, is energized to pivotably drive a pair of outboard J-hooks 73 through sets of reduction gears 75. J-hooks 73 are rotated in a fore-and-aft manner along a generally vertical plane to engage latching receptacle structures mounted to a front header panel 79 disposed above a windshield. A set of microswitches 81 are employed to sense the latching position of J-hooks 73 thereby sending an electric signal to a microprocessor, analog or solid state based electronic control unit (not shown). Levers 83, having bifurcated ends, act in conjunction with fulcrums 85 for downwardly and upwardly pivoting front roof rails 33 relative to center roof rails 35 in an automatic manner operably driven by electric motor 71. This latching device is disclosed in further detail in U.S. patent application Ser. No. 08/912,821 entitled "Latching and Control Apparatus for an Automotive Vehicle Convertible Roof," which was invented by Sheryar Durrani and is filed concurrently herewith; this patent application is incorporated by reference herein. Since the convertible roof actuation mechanism of the present invention is essentially symmetrically identical on both sides of the vehicle, only one side will be further discussed hereinafter.

Figure 3:
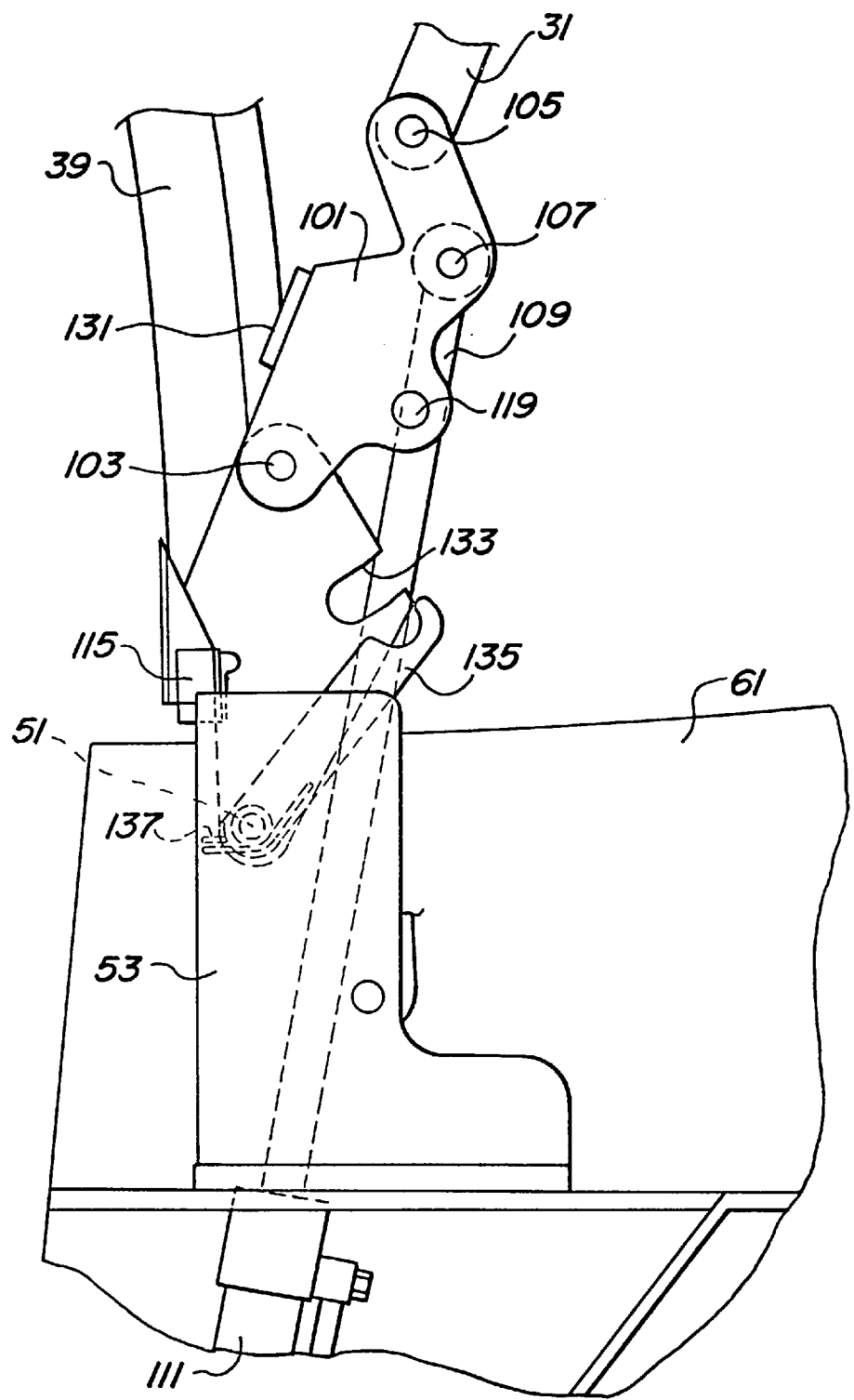
FIG. 3 is an enlarged side elevational view, taken within circle 3—3 of FIG. 2B, showing the preferred embodiment of the convertible roof actuation mechanism.
Figure 4:
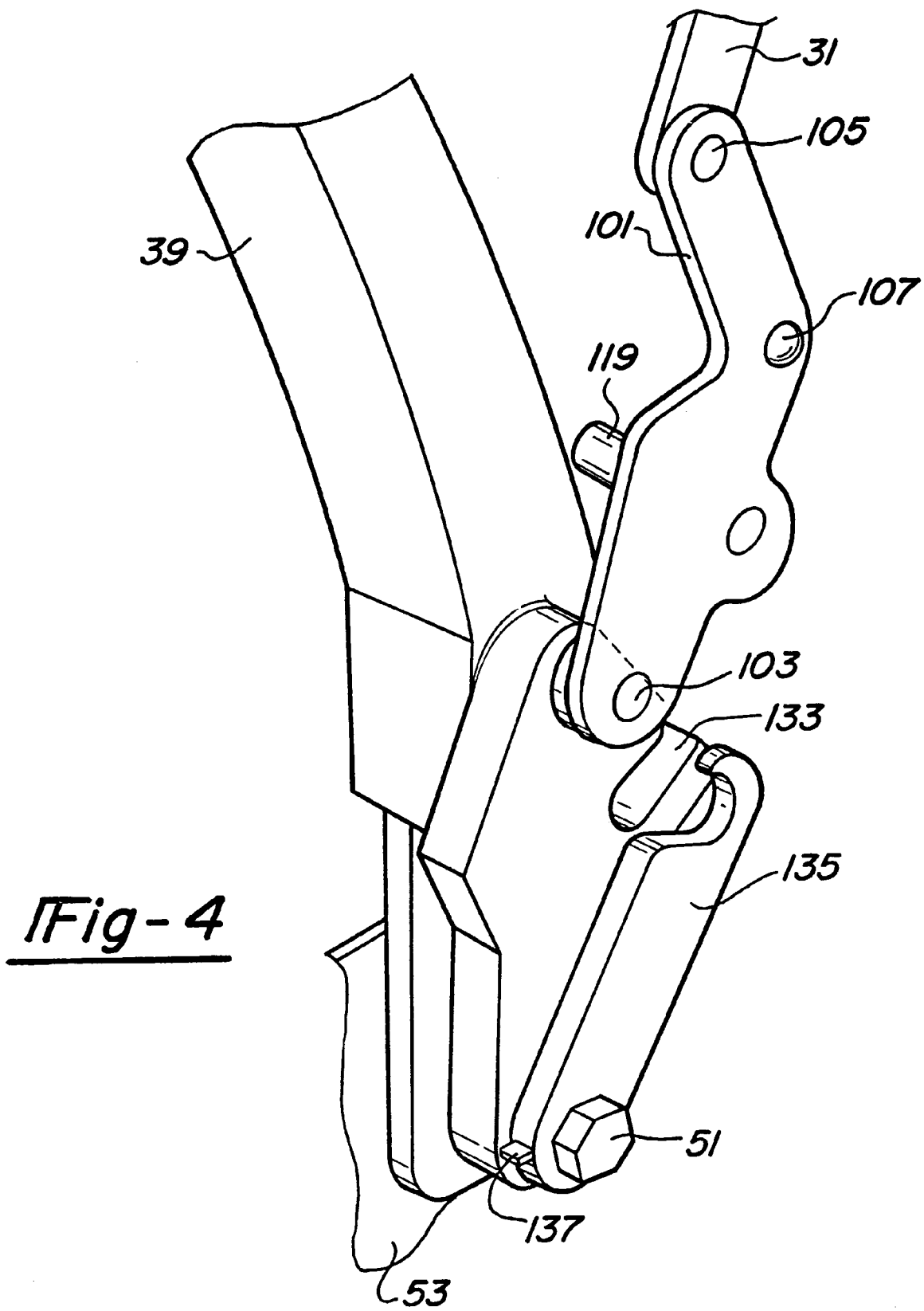
FIG. 4, is a fragmentary front perspective view showing the preferred embodiment of the convertible roof actuation mechanism, disposed in a fully raised position.
Figure 5:
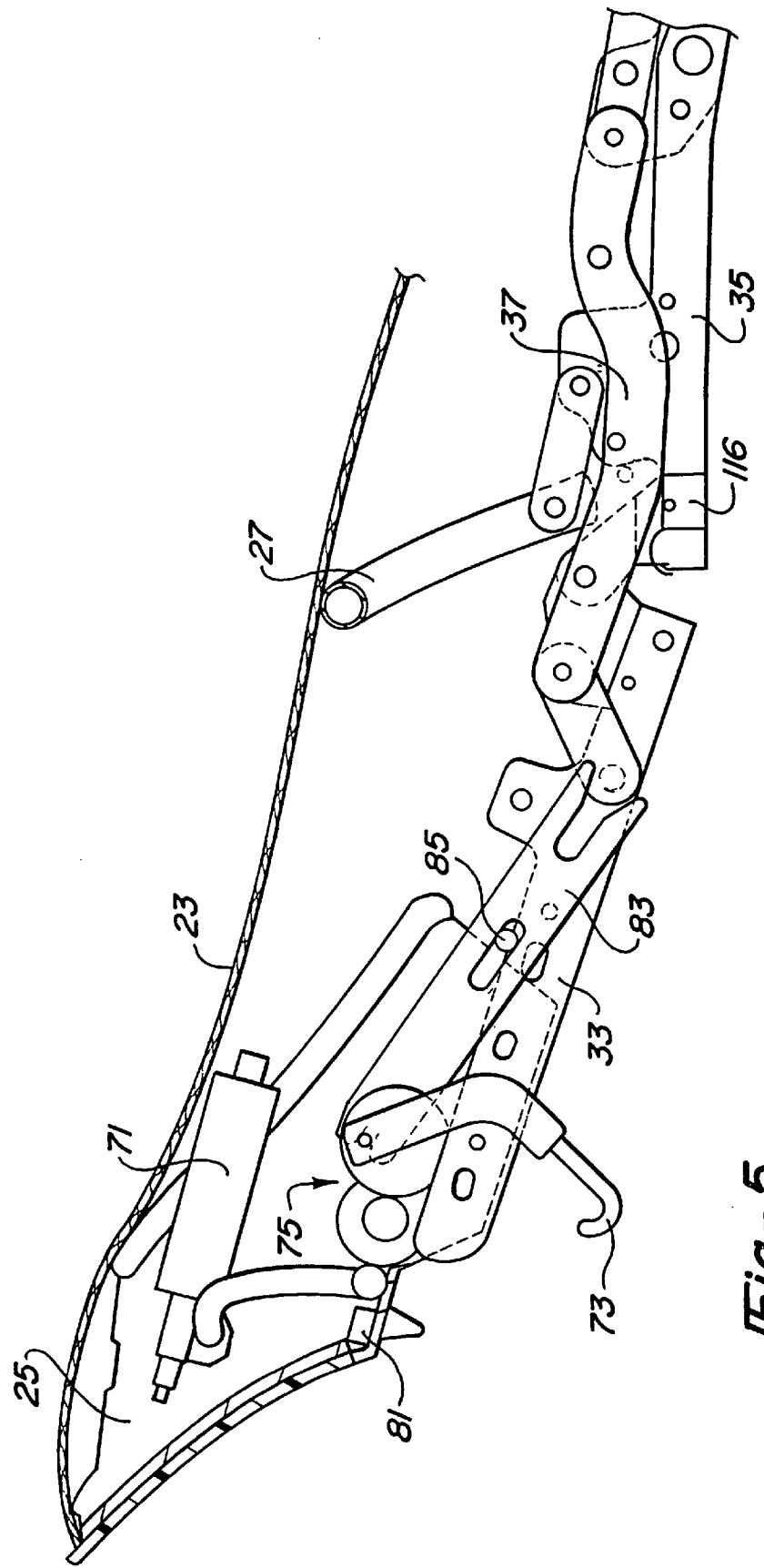
FIG. 5 is a side elevational view showing the forward portion of the preferred embodiment of the convertible roof actuation mechanism, disposed in an unlatched and pivoted position.

Referring now to FIGS. 2B, 3 and 4, a bell crank 101 has a first pivot 103 mounted on rear roof rail 39. A lower pivot 105 of number four bow 31 is also pivotably coupled to an opposite end of bell crank 101, while a center driving pivot 107 of bell crank 101 is coupled to a linearly moving piston rod 109 of a hydraulic fluid powered piston-type actuator 111 by a ball and socket arrangement. Piston 111 is fluidically coupled to a hydraulic pump 113 and is electrically connected to a rear roof rail-to-bracket position sensing microswitch 115, a front roof rail-to-center roof rail position sensing microswitch 116 (only on one side) (see FIG. 5), an occupant accessible top up/down switch and the electronic control unit. Piston 111 is allowed to pivot about a clevis at pivot point 117 in relation to the vehicle's body 55.

A roller pin 119 transversely projects from a flat face of bell crank 101. Bell crank 101 is preferably made from a sheet of steel, is injection molded from an engineering grade of polymeric material or may be die cast from a zinc alloy, aluminum or magnesium. An upstop 131 is affixed for movement with rear roof rail 39 and acts to limit the upward travel of bell crank 101 in relation to rear roof rail 39.

A locking structure is provided on rear roof rail 39. The locking structure includes an arcuate slot 133 being open to the rear of roof rail 39, and a torsion spring or leaf spring biased aluminum hook 135 rotatably coupled to rear roof rail 39. Hook 135 also has an upstop 137 which abuts against a ledge on the main pivot bracket for limiting the upward rotational movement of hook 135.

Figure 6:
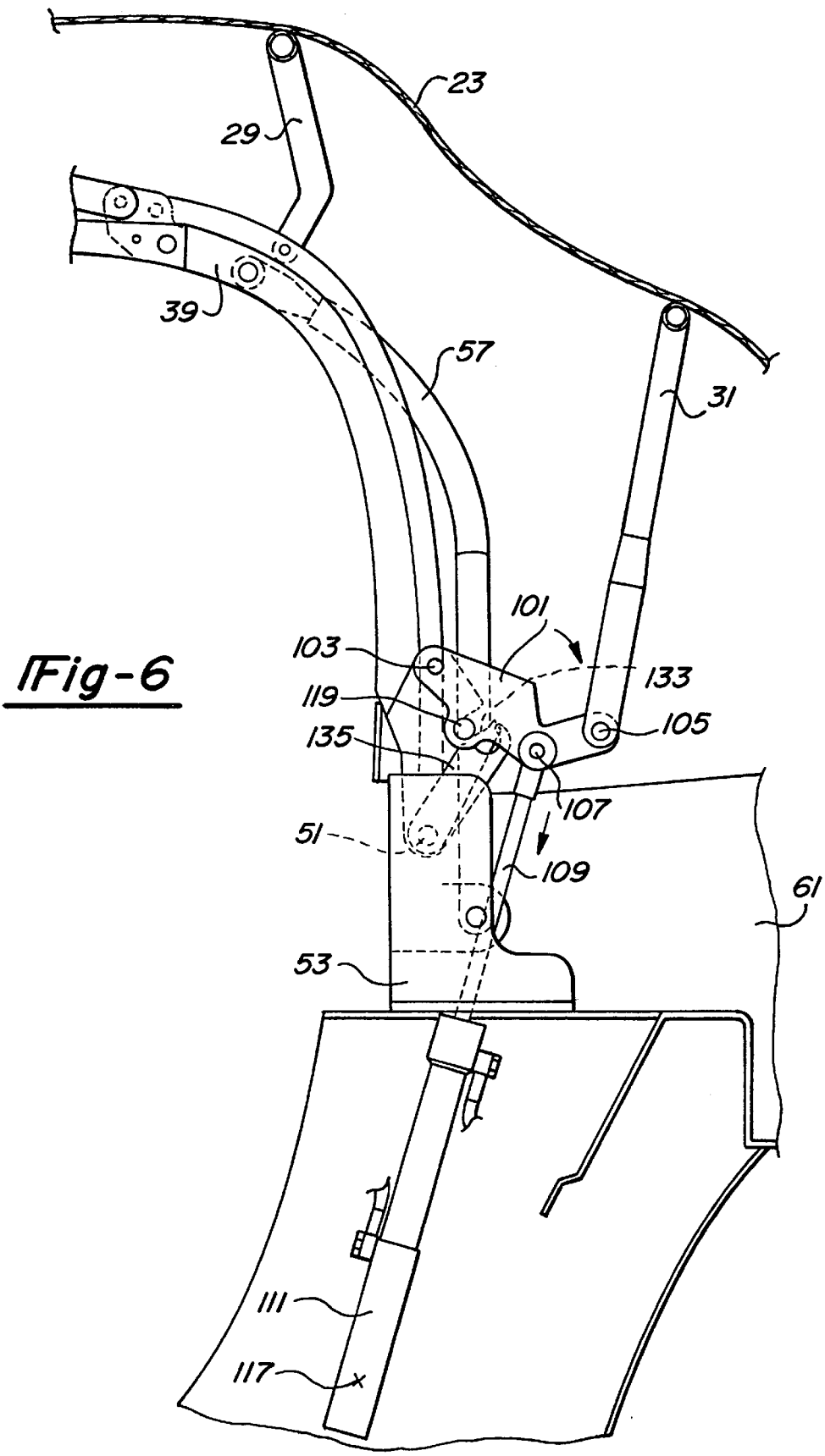
FIG. 6 is a side elevational view showing a rear portion of the preferred embodiment of the convertible roof actuation mechanism, disposed in an intermediate position.

The retracting operation of the convertible roof actuation mechanism of the present invention will now be discussed. First, the convertible roof is moved from the position of FIGS. 2A and 2B to that shown in FIG. 5, while maintaining the fully raised position of rear roof rail 39. This is achieved by unlatching hook 73 from the front header panel and by automatically causing lever 83 to pivot front roof rail 33 and number one roof bow 25 relative to the currently stationary center roof rail 35. Second, FIGS. 2B and 6 illustrate the subsequent retraction movement of the convertible roof. Piston rod 109 is caused to linearly retract downward into piston 111 thereby causing bell crank 101 to pivot about pivot 103 while rear roof rail 39 is maintained in its fully raised position. This action concurrently causes number four bow 31 to rotate downwardly and away from the upper section of rear roof rail 39 until pin 119 fully engages in locking slot 133 of rear roof rail 39. Thus, number four bow 31 is moved independently from rear roof rail 39 in this positional range.

Third, subsequent retracting movement of piston rod 109 causes top stack mechanism 21, including rear roof rail 39, to retract and pivot about main or bottom pivot 51 of rear roof rail 39 in concert with continued movement of number four bow 31, due to the interface of pin 119 in the locking structure. Pin 119 is further retained in locking slot 133 by engagement with hook 135 thereby preventing pin 119 from inadvertently disengaging when slot 133 is inverted. Therefore, piston 111 serves to also retract the top stack mechanism simultaneously with number four bow 31 in this second positional range for collapsing the entire top stack mechanism.

Figure 7:
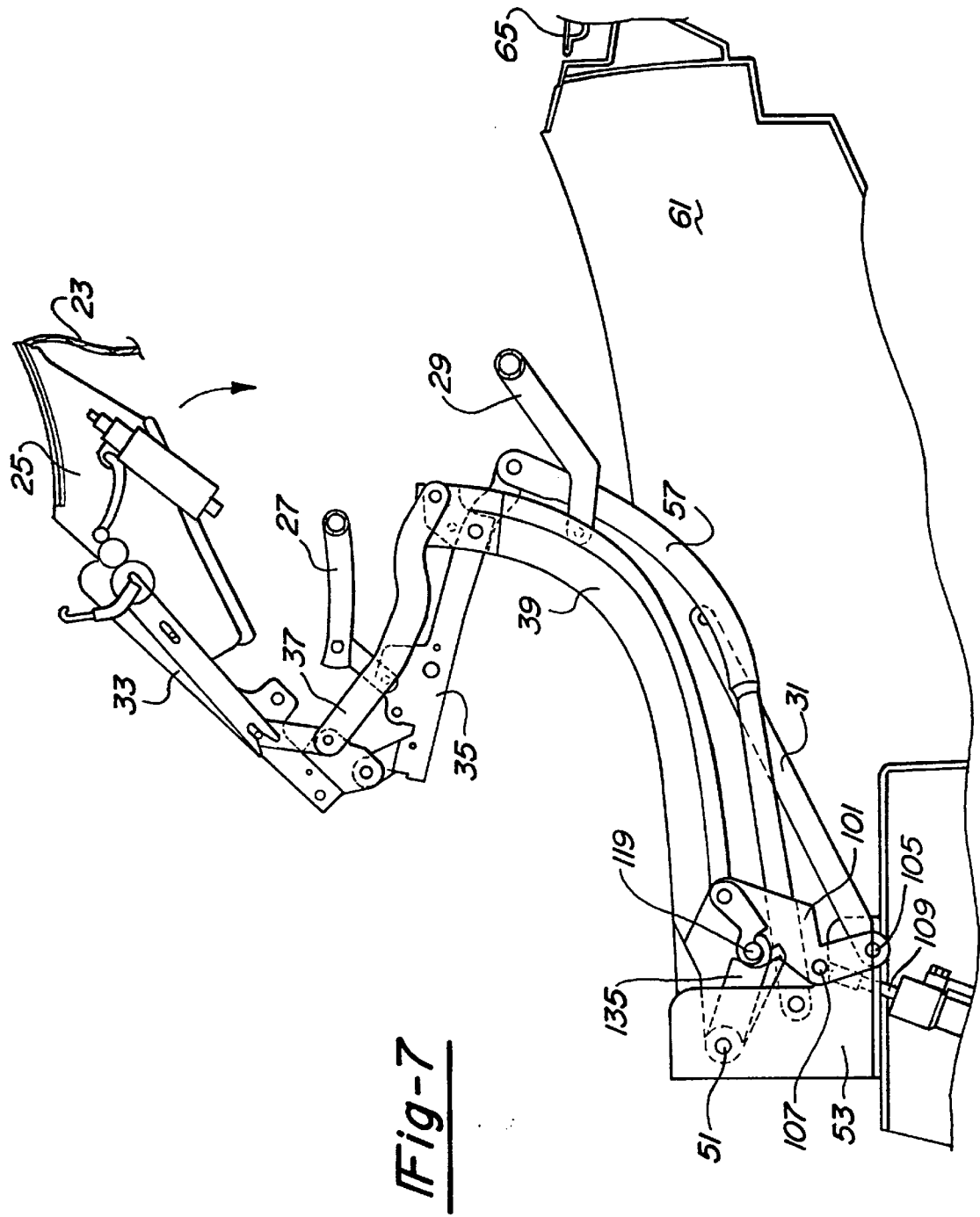
FIG. 7 is a side elevational view showing the preferred embodiment of the convertible roof actuation mechanism, disposed in a partially retracted position.

Fourth, the convertible roof is moved from the partially retracted position of FIG. 7 to the fully retracted position of FIG. 8. Piston rod 109 is fully retracted into piston 111 thereby causing bell crank 101 and the lower pivot of number four roof bow 31 to have rotated more than 180 degrees from their fully raised positions. In the fully retracted and stowed position of FIG. 8, lower pivot 105 of number four roof bow 31 is generally located no further rearward in the automotive vehicle than it was in its fully raised position of FIG. 2B. Lower pivot 105 of number four roof bow 31 is also located within approximately three inches of bottom pivot 51 of rear roof rail 39, as measured in a fore-and-aft or longitudinal direction of the automotive vehicle, when the convertible roof is disposed in its fully retracted position. This number four roof bow positioning optimizes packaging of the folded components within boot 61 such that a much larger than standard rigid, glass backlite can be stored within the relatively small sized boot well 61. Backlite 151 has a length of at least 300 millimeters as measured along a vertical fore-and-aft plane and is three-dimensionally curved, however, number four roof bow 31 is fully retracted forward of a majority of backlite 151. Backlite 151 is secured to roof cover 23 as is disclosed in U.S. patent application Ser. No. 08/916,820 entitled "Backlite Retention System for Use in an Automotive Vehicle Convertible Roof," which was invented by Steven G. Laurain and Michael T. Willard and is being filed concurrently herewith; this application is incorporated by reference herein.

In reverse operation of the convertible roof from the stowed and retracted position to the fully raised position, piston rod 109 will linearly advance for driving bell crank 101 out of boot well 61. This causes number four bow 31, rear roof rail 39 and the rest of top stack mechanism 21 to upwardly pivot as a single unit about bottom pivot 51. Next, number four roof bow 31 is allowed to independently rotate relative to the fully raised rear roof rail 39 by further advancing of piston rod 109 and bell crank 101, after front roof rail 33 is downwardly pivoted from the position of FIG. 5 to that of FIG. 2A, and after latching hook 73 engages the front header panel. This advancing action of number four roof bow 31, from its intermediate position of FIG. 6 to its fully raised position of FIG. 2B, causes tightening, tensioning or stretching of roof cover 23 after latching so as to easily achieve convertible roof-to-body fastening but then subsequently provide the desired taut roof cover appearance and function.

While various aspects of the convertible roof actuation mechanism have been disclosed, it will be appreciated that many other variations may be employed without departing from the scope of the present invention. For example, multiple roof bows can be moved independently from the fully raised and static top stack mechanism to selectively reduce and increase the roof cover tension to assist with latching. Furthermore, movement of the number four bow can also be employed to assist with latching an optional number five bow (not shown) attached to a movable rear edge of the roof cover, to the vehicle body. It is alternately envisioned that an electric motor can be employed to directly rotate a bell crank or other mechanically advantageous member to move the number four roof bow relative to the remainder of the top stack mechanism in place of a linear hydraulic actuator. A linearly driven, telescoping number four bow, with a stationary lower pivot axis, can also be employed. Various materials and linkages have been disclosed in an exemplary fashion, however, other materials and linkages may of course be employed. It is intended by the following claims to cover these and any other departures from the disclosed embodiments which fall within the true spirit of this invention.

The invention claimed is:

1. A convertible roof actuation mechanism for an automotive vehicle, said mechanism comprising:
   a pliable roof cover movable from a raised position to a retracted position;
   a rigid backlite attached to said roof cover;
   a roof bow having an upper segment located substantially above said backlite and supporting a portion of said roof cover; and
   a rear roof rail movable between raised and retracted positions;
   said upper segment of said roof bow being movable when said rear roof rail is stationary.

2. The mechanism of claim 1 wherein said roof bow moves relative to said rear roof rail when said rear roof rail is maintained in its raised position.

3. The mechanism of claim 2 further comprising a bell crank coupled to an actuator and to a lower pivot of said roof bow, said lower pivot of said roof bow being spaced away from said rear roof rail.

4. The mechanism of claim 3 further comprising a locking structure acting to retain a section of said bell crank to said rear roof rail when said rear roof rail is moved from its raised position to its retracted position, said section of said bell crank disengaging said locking structure when said rear roof rail is in its raised position and said roof bow is advanced to its fully raised position.

5. The mechanism of claim 1 further comprising a lower pivot of said roof bow located substantially no further rearward in said automotive vehicle between its raised position and its retracted position.

6. The mechanism of claim 1 further comprising a lower pivot of said roof bow located within about three inches of a lower pivot of said rear roof rail, as measured in a fore-and-aft direction, when said roof cover is disposed in said retracted position.

7. The mechanism of claim 1 further comprising an actuator operable in a linear manner to advance and retract the height of said upper segment of said roof bow while maintaining a position of said rear roof rail, said actuator also operably driving said rear roof rail between its raised and retracted positions.

8. The mechanism of claim 1 further comprising a rear edge of said roof cover stationarily affixed to a body of said automotive vehicle regardless of the positioning of the remainder of said roof cover.

9. The mechanism of claim 1 further comprising a storage compartment disposed between a passenger front seat and a trunk, said backlite being made of three-dimensionally curved glass and having a length of at least 300 millimeters as measured along a vertical fore-and-aft plane, said roof cover and said backlite being retracted into said storage compartment.

10. A convertible roof system or an automotive vehicle having a body, said system comprising:
    a pliable roof cover having a rear edge;
    a rigid window attached to said roof cover; and
    a top stack mechanism including a roof bow, said roof cover being supported on top of said roof bow, said top stack mechanism and said roof cover being movable from a retracted position to a raised position;
    said rear edge of said roof cover being securely mounted to said body of said automotive vehicle and being substantially prevented from moving relative to said body;
    said roof bow being disposed in an intermediate position between its retracted position and its fully raised position when substantially the remainder of said top stack mechanism is disposed in its fully raised position until said top stack mechanism is latched to said body of said automotive vehicle, whereafter said roof bow is advanced from said intermediate position to its fully raised position;
    whereby movement of said roof bow increases tension of said roof cover after said top stack mechanism is latched to said body of said automotive vehicle.

11. The system of claim 10 further comprising a roof rail of said top stack mechanism, said roof bow moving relative to said roof rail when said roof rail is maintained in its raised position.

12. The system of claim 11 further comprising a bell crank coupled to an actuator and to a lower pivot of said roof bow, said lower pivot of said roof bow being spaced away from said roof rail.

13. The system of claim 12 further comprising a locking structure acting to retain a section of said bell crank to said roof rail when said roof rail is moved from its raised position to its retracted position, said section of said bell crank disengaging said locking structure when said roof rail is in its raised position and said roof bow is advanced to its fully raised position.

14. The system of claim 10 further comprising a lower pivot of said roof bow being located substantially no further rearward in said automotive vehicle between its raised position and its retracted position.

15. The system of claim 10 further comprising a lower pivot of said roof bow being located within about three inches of a bottom pivot of a rear roof rail, as measured in a fore-and-aft direction, when said roof cover is disposed in its retracted position.

16. The system of claim 10 further comprising an actuator operable in a linear manner to advance and retract the height of an upper portion of said roof bow while maintaining a position of a roof rail, said actuator also operably driving said top stack mechanism between its raised and retracted positions.

17. The system of claim 10 further comprising a storage compartment disposed between a passenger front seating and a trunk, said window is a backlite being made of three-dimensionally curved glass and having a length of at least 300 millimeters as measured along a vertical fore-and-aft plane, said roof cover and said backlite being retracted into said storage compartment.

18. The system of claim 10 further comprising a powered latching device mounted to a forward portion of said top stack mechanism, said powered latching device sending a signal to a powered actuator driving said at least one of said roof bows indicating a predetermined top stack mechanism-to-body condition.

19. The system of claim 10 wherein said roof bow telescopically moves from its retracted position to its intermediate position.

20. The system of claim 10 further comprising a plurality of said roof bows being movable from intermediate positions to fully raised positions after said top stack mechanism is latched to said body.

21. A convertible roof actuation mechanism for an automotive vehicle, said mechanism comprising:
 a rear roof rail having a bottom pivot;
 a roof bow having a lower pivot;
 a crank coupling said lower pivot of said roof bow to said rear roof rail;
 a powered actuator coupled to said crank for moving said roof bow independent of said rear roof rail;
 a locking structure securing said crank to said rear roof rail when said rear roof rail moves from its raised position to its retracted positions; and
 a spring biasing a portion of said locking structure relative to said rear roof rail.

22. The mechanism of claim 21 wherein said locking structure includes a slot in said rear roof rail and a hook rotatably coupled to said rear roof rail, a pin moving with said crank selectively engagable in said slot and by said hook to couple retracting movement of said roof bow with retracting movement of said rear roof rail.

23. The mechanism of claim 22 further comprising a stop mounted on said rear roof rail for limiting movement of said hook.

24. The mechanism of claim 21 wherein said lower pivot of said roof bow is fixedly journalled in relation to said crank, and said lower pivot rotates from a raised position substantially above said bottom pivot of said rear roof rail to a retracted position substantially below said bottom pivot.

25. The mechanism of claim 21 further comprising:
 a center roof rail pivotably coupled to said rear roof rail; and
 a balance link coupling said center roof rail to a body of said automotive vehicle;
 said actuator operably advancing and retracting said roof bow relative to said rear roof rail after said actuator moves said rear roof rail to its raised position.

26. A convertible roof actuation system comprising:
 a top stack mechanism including a set of roof bows;
 a roof cover disposed on said roof bows;
 a top stack latching mechanism;
 a powered actuator operably driving said top stack mechanism; and
 at least one of said roof bows being movably driven relative to the remainder of said top stack mechanism by said actuator after said actuator receives a signal that said latching mechanism has reached a desired condition.

27. The system of claim 26 further comprising a rear edge of said roof cover substantially prevented from movement.

28. The system of claim 26 further comprising a rigid backlite secured to said roof cover, said roof cover being pliable.

29. The system of claim 26 wherein said actuator is a fluid powered piston including a linearly moving piston rod, wherein said piston is pivotable about a pivot point.

30. The system of claim 27 wherein said piston also serves to move said top stack mechanism from its retracted position to its raised position and then moves said at least one of said roof bows after said top stack mechanism has reached its raised position.

31. A convertible roof actuation mechanism comprising:
 a pliable roof cover;
 a top stack mechanism supporting said roof cover;
 an automatically powered actuator; and
 at least one roof bow of said top stack mechanism movably driven independent of the remainder of said top stack mechanism by actuation of said actuator in a first positional range;
 said at least one roof bow and the remainder of said top stack mechanism being movably driven in concert with each other by actuation of said actuator in a second positional range.

32. The mechanism of claim 31 wherein said actuator is a linearly actuating fluid powered piston.

33. The mechanism of claim 31 further comprising a rigid backlite attached to said roof cover.

34. The mechanism of claim 31 wherein said at least one roof bow is a number four roof bow having a lower pivot which moves closer to a main pivot coupling said top stack mechanism to a vehicle body.

35. The mechanism of claim 31 wherein said at least one roof bow is selectively increased and reduced in height relative to a vehicle body during actuation in said first positional range.

36. A method of operating a convertible roof in an automotive vehicle with a single automatically powered actuator on each side of said vehicle, said method comprising:

(a) moving a convertible roof from a retracted position to a raised position by energizing said actuator;

(b) latching a number one roof bow of said convertible roof to a body of said automotive vehicle;

(c) moving another roof bow after step (b) while said number one roof bow is still latched to said body by further energizing the same actuator; and (d) maintaining a rearmost portion of said convertible roof in a stationary orientation relative to said body during the preceding steps.

37. The method of claim 36 further comprising stretching a pliable roof cover of said convertible roof during movement of said other roof bow.

38. The method of claim 36 further comprising:

(a) energizing said actuator for linear movement;

(b) rotating a crank in response to step (a); and (c) rotating a lower pivot of said other roof bow in response to step (b) relative to a rear roof rail of said convertible roof.

39. A method of actuating a convertible roof of an automotive vehicle having a rear roof rail, a roof bow and a pliable roof cover, said method comprising the:

(a) moving said roof rail to a raised position;

(b) moving at least a portion of said roof bow while maintaining said roof rail in said raised position;

(c) selectively engaging a second portion moving with said roof bow in step (b) with said roof rail; and (d) moving said roof bow in concert with said roof rail after step (c).

* * * * *

UNITED STATES PATENT AND TRADEMARK OFFICE
CERTIFICATE OF CORRECTION

PATENT NO. : 5,903,119
DATED : May 11, 1999
INVENTOR(S) : Steven G. Laurain et al It is certified that error appears in the above-identified patent and that said Letters Patent is hereby corrected as shown below:

Column 2, line 51, after "4" delete -- , --.

Column 6, line 40, "or" should be -- for --.

Column 7, line 56, "positions" should be -- position --.

Column 10, line 6, delete "the".

Signed and Sealed this

Eleventh Day of April, 2000

Attest:

Q. TODD DICKINSON

*Attesting Officer*  *Director of Patents and Trademarks*